Patented Jan. 6, 1953

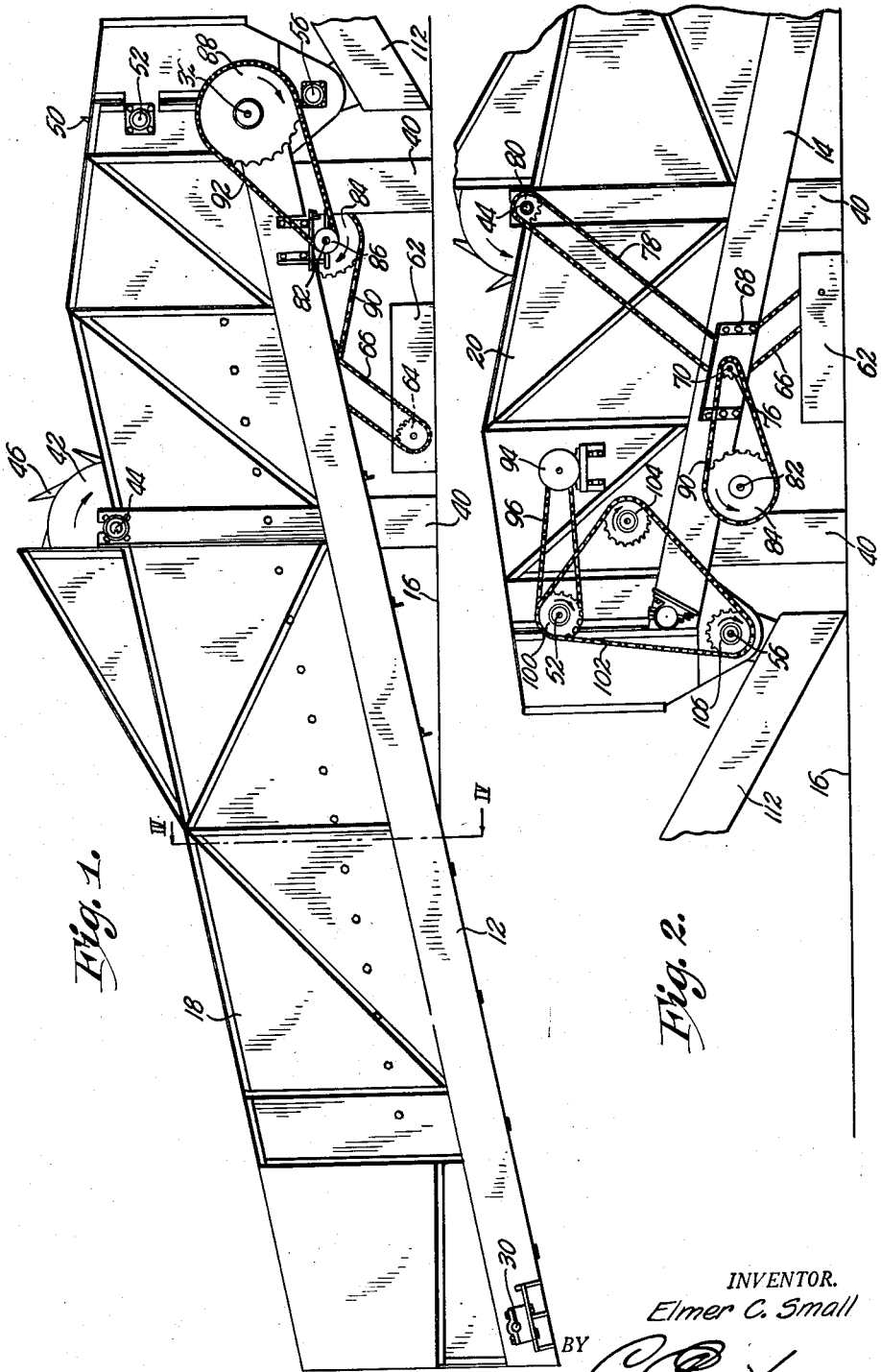

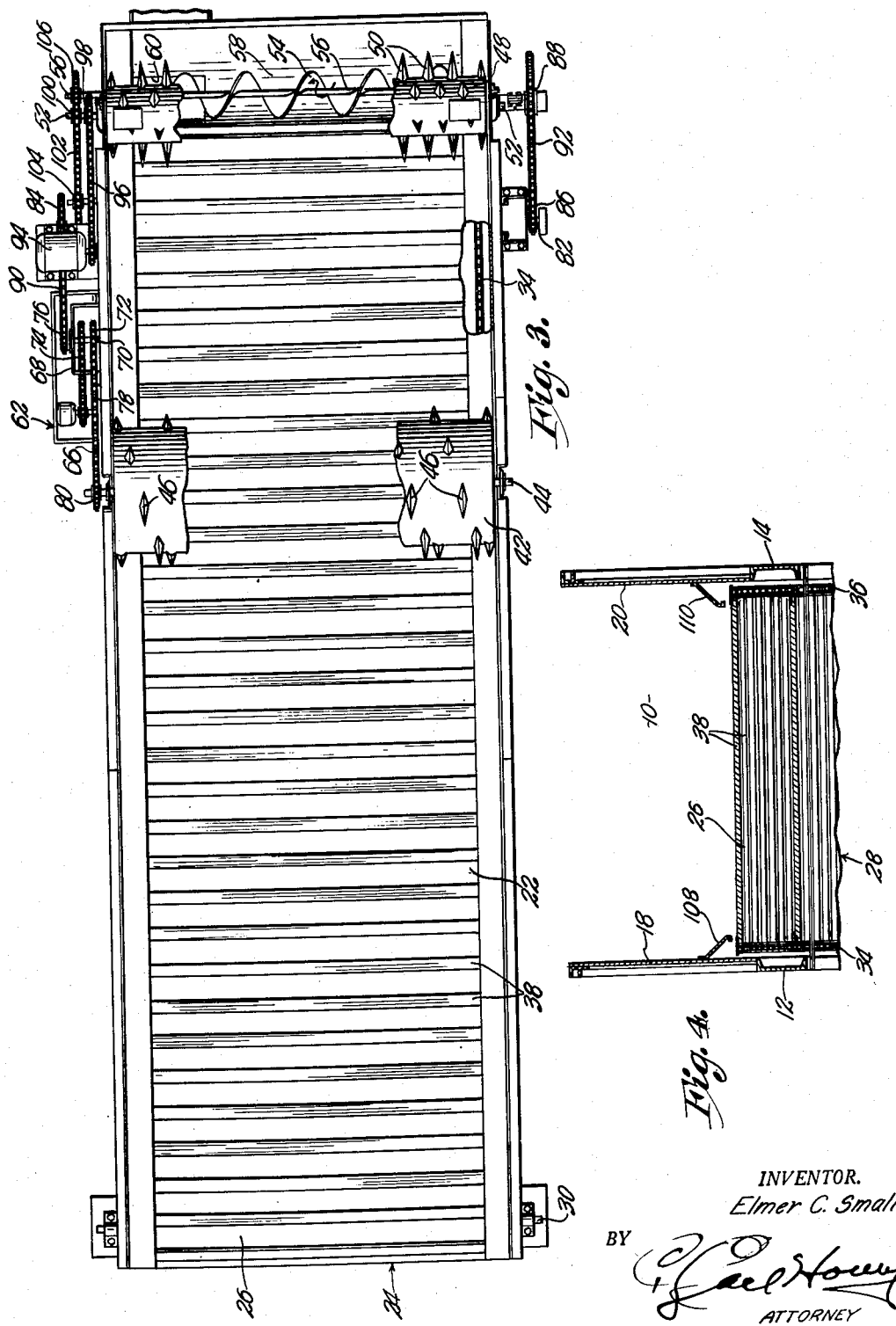

2,624,447

UNITED STATES PATENT OFFICE 2,624,447

MATERIAL FEEDER FOR DEHYDRATORS

Elmer C. Small, Neodesha, Kans., assignor, by mesne assignments, to Archer-Daniels Midland Company, a corporation of Delaware Application June 5, 1950, Serial No. 166,196

2 Claims. (Cl. 198—161)

This invention relates to material handling equipment, the primary object being to provide structure for moving the material to a desired point of discharge and having apparatus forming a part thereof for leveling the material and for feeding the same into an auxiliary feeder in an even flow irrespective of the bulkiness of the material and the speed at which the same is delivered to the auxiliary feeder.

There has developed in the past few years, a method of handling feed for animals that includes dehydration thereof. This development has created many problems, the most recent of which is that of feeding the cut crop to the dehydrator in an even flow while eliminating the laborious task of manually scooping or otherwise feeding the crop into the intake end of the dehydrator itself.

It is the most important object of the present invention therefore, to provide a feeding assembly that is adaptable to accommodate a number of loads of the cut hay, such as alfalfa and to continuously feed the same to the dehydrator at a predetermined speed, there being structure for regulating the evenness of the flow thereof.

Another important object of the present invention is to provide a feeder for alfalfa dehydrators and the like, including an elongated chute having a conveyor therein, together with a number of rotatable fingered drums above the conveyor for acting upon the crop thereon and thereby leveling the same and causing an even flow into the dehydrator drum.

Another important object of the present invention is the provision of leveling means for conveyor-type feeders that includes a rotatable drum having a number of laterally projecting fingers thereon located above the conveyor and acting upon the material in a direction opposite to its normal path of travel whereby to maintain the same in a level condition within the conveyor chute.

A further object of the present invention lies in the provision of a feeder that also constitutes a rotatable drum adjacent the outlet end of the conveyor for directing the material from the conveyor into a receptacle having an auger therein, and with such evenness of flow as to prevent clogging and choking of the dehydrator itself.

Other objects of the present invention include the way in which the material-receiving receptacle is in underlying relationship to the conveyor at one end thereof, and is provided with continuously rotating auger for feeding the material to one end of the receptacle; the way in which an elevator is provided to receive the material from the receptacle and direct the same to the dehydrator; the way in which certain parts of the entire assembly are rotated in opposite directions to accomplish the desired effect and result; and the manner of utilizing a plurality of fingers or spikes on the leveling and feeding drums so disposed as to properly act upon the feed and at the same time prevent tangling and clogging of the feed with respect to the drums, the conveyor and other parts of the apparatus.

In the drawings:

Figure 1 is a side elevational view of a material feeder for dehydrators made in accordance with my present invention.

Fig. 2 is a fragmentary, side elevational view showing that side of the feeder opposite to that illustrated in Fig. 1 of the drawings.

Fig. 3 is a top plan view, parts being broken away to reveal details of construction; and Fig. 4 is a transverse, sectional view taken on line IV—IV of Fig. 1.

In order to present an elongated, inclined chute 10, there is provided a pair of spaced-apart, elongated, angularly disposed beams 12 and 14. In order to facilitate dumping of material into chute 10 at the lowermost end thereof, the elongated beams 12 and 14 extend below horizontal surface 16 in the manner clearly illustrated in Fig. 1 of the drawings.

A pair of spaced-apart, upright side walls 18 and 20 on beams 12 and 14 respectively, extend upwardly therefrom and the bottom of the chute 10 is defined by a bottom wall 22. An endless conveyor, broadly designed by the numeral 24, has an uppermost stretch 26 upon the wall 22 and a lowermost stretch 28 underlying wall 22.

Conveyor 24 extends the full length of the chute 10 and is trained about opposed shafts 30 and 32 at opposite ends of the chute 10 and spanning the distance between beams 12 and 14. Each of the shafts 30 and 32 is provided with a pair of spaced-apart sprockets (not shown) for receiving endless chains 34 and 36 forming a part of the conveyor 24.

A plurality of elongated, spaced-apart slats 38, traversing the bottom wall 22, interconnect the chains 34 and 36. The lowermost end of the chute 10, including its supported conveyor 24, is supported in any suitable manner, not shown, and the uppermost end thereof is held above the surface 16 by a plurality of legs 40.

An elongated, preferably cylindrical, hollow drum 42, supported by a shaft 44 rotatably interconnecting walls 18 and 20, is disposed intermediate the ends of the chute 10 in overlying spaced relationship to the conveyor 24. The drum 42 is provided with a plurality of laterally extending, inclined staggered fingers or spikes 46. A second drum 48 similar to drum 42, is provided with a number of fingers or spikes 50 and is also supported by a shaft 52 that spans the distance between walls 18 and 20 and is rotatably carried thereby.

The drum 48 is spaced above the conveyor 24 adjacent the uppermost end thereof and it is seen that both of the drums 42 and 48 are adapted for rotation on an axis traversing the path of travel of the conveyor 24. In other words, the axes of rotation of shafts 30, 32, 44 and 52 are substantially parallel.

An auger 54 disposed immediately below the uppermost end of the conveyor 24 is supported by a shaft 56 spanning the distance between walls 18 and 20 and rotatably secured thereto. Auger 54 is disposed within a receptacle 58 having an open top and underlying auger 54. Receptacle 58 is at least partially semi-circular in cross-section and provided with an outlet opening 60 at one end thereof.

The conveyor 24 and the drum 42 are driven simultaneously by means of a common prime mover which, together with a suitable speed reducer and speed varying apparatus, is illustrated schematically only in the drawings and broadly designated by the numeral 62. The latter is provided with a driven sprocket 64 for receiving an endless chain 66. A bracket 68 on the outermost face of beam 14 cooperates with the latter in rotatably supporting an idler shaft 70 having three sprocket wheels 72, 74 and 76 secured thereto. The endless chain 66 is also trained over the sprocket wheel 74 and a second endless chain 78 interconnects sprocket wheel 72 with a sprocket wheel 80 on shaft 44. An elongated idler shaft 82 underlying the stretch 28 of conveyor 24 and extending entirely across the chute 10 is rotatably supported by the beams 12 and 14 and carries a pair of spaced-apart sprocket wheels 84 and 86. That end of the conveyor shaft 32 proximal to beam 12 has a sprocket wheel 88 secured thereto. An endless chain 90 joins sprocket wheels 76 and 84 and an endless chain 92 joins sprocket wheels 86 and 88.

The drum 48 and the auger 54 are driven by a prime mover 94 mounted upon the outermost face of wall 20 and operably connected with shaft 52 by means of an endless chain 96 trained over a sprocket wheel 98 rigid to shaft 52. A second sprocket wheel 100, also rigid to shaft 52, receives an endless chain 102 that is also trained over an idler sprocket wheel 104 on wall 20 and a sprocket wheel 106 on auger shaft 56.

As indicated by the arrows in Figs. 1 and 2, the directions of rotation of shafts 52 and 56, as driven by prime mover 94, are the same and opposite to the directions of rotation of shafts 44, 70, 82, 30 and 32 as driven by the prime mover assembly 62. It is not necessary to vary the speed of travel of the auger 54 and the drum 48, but if desired, such speed adjustment could be incorporated in the prime mover 94. However, it is highly important that the speed of movement of the conveyor 24 and of the leveling drum 42 be varied and hence the provision of the speed adjustment that is incorporated in assembly 62.

It is noted in Fig. 4 of the drawings, that the walls 18 and 20 are provided with elongated aprons 108 and 110 respectively on the innermost faces thereof and adjacent the conveyor 24. The aprons 108 and 110 partially overlie the conveyor 24 and particularly the chains 34 and 36 thereof to prevent movement of the material on conveyor 24, downwardly between the conveyor 24 and the sides of the chute 10.

The particular nature of the fingers or spikes 46, 50 is notable and it is seen that the same are hollow, triangular pyramids with the apexes thereof remote from the respective drum 42 or 48 as the case may be. In each case, the spikes 46, 50 are angled away from the direction of travel of the corresponding drum. In other words, as shown in Fig. 1, the elongated meeting edge of the two triangular side walls of each spike 46 extends outwardly from the drum 42 and at an angle opposite to the direction of rotation of drum 42 as indicated by the arrow in Fig. 1. Since the drum 48 rotates oppositely to the drum 42, the spikes 50 of the former are angled toward the uppermost end of the chute 10.

The material that is discharged through outlet 60 falls by force of gravity into an angularly disposed housing 112 having a conventional elevator therein not shown, and adapted to direct the material to any suitable point of discharge such as into a conventional dehydrator drum (not shown).

In operation, the material to be handled and in the present instance, chopped alfalfa, hay or other crop to be dehydrated, is dumped into the chute 10 upon the conveyor 24 at the lowermost end of the latter. The conveyor 24 carries the material upwardly between walls 18 and 20 toward the constantly rotating drum 42 and as the spikes 46 of the latter come into contact with the material, the material is leveled across the conveyor 24 between the walls 18 and 20. It is noted that because of the direction of rotation of drum 42, it tends to move the conveyed material back toward the lowermost end of conveyor 24. This action upon the alfalfa or other crop causes the same to pass beneath drum 42 toward the drum 48 in a substantially level condition across conveyor 24 and between the walls 18 and 20 of chute 10. Because of the inclination of the spikes 46 of drum 42, the latter continues to rotate easily without entangling with the material or carrying the latter around drum 42 as the same rotates. If the material moves into contact with drum 42 in a matted, bulky and lumpy condition, the fingers or spikes 46 of drum 42, tend to shred the material or tear the same loose and thereby cause leveling thereof.

As the material in its level condition moves into contact with the drum 48, the spikes 50 thereof will feed the material evenly and continuously into the receptacle 58 for movement by the continuously rotating auger 54 along the concave portion of receptacle 58 toward discharge opening 60 thereof.

In practice, the material merely slides along the receptacle 58 toward the opening 60 and is seldom carried around the auger 54. In other words, the drum 48 feeds the material from the conveyor 24 evenly and slowly directly into the receptacle 58 for movement thereof by auger 54. Obviously, from the discharge opening 60 the material is carried upwardly in housing 112 toward the dehydrator by the elevator within housing 112. The combined effects of the conveyor 24, the leveling drum 42, the feeding drum 48 and the auger 54 is to feed the chopped hay or other crop into the dehydrator drum at an even rate of flow and at the exact speed desired. Through use of the assembly, choking of the dehydrator or starving the same is entirely eliminated. In absence of the drum 48, the material emanating from conveyor 24 would have a tendency to "pile-up" above the auger 54 and not be carried evenly into the discharge opening 60. In the same manner, elimination of the leveler 42 would cause the hay to be delivered to the auger 54 and to the drum 48 in bunches unevenly distributed across the conveyor 24 with the resultant uneven feeding thereof into the dehydrator or other ultimate discharge point. Consequently, the drums 42 and 48 cooperate with each other and with the conveyor 24 and the auger 54 in accomplishing the desired results hereof. Because of the speed differentiating means provided in the assembly 62, the rate at which the material is fed to the drum 48 into the auger 54, can be varied to suit the desires of the operator and to accommodate crops of differing weights, bulkiness and other characteristics. Through use of the entire assembly, even feeding of the material is made possible with accuracy that is even far better than that made possible through manual feeding thereof into the dehydrator mill.

It is apparent from the foregoing that the apparatus is subject to many changes and modifications particularly in details of construction and therefore, it is desired to be limited only by the broad concepts of the invention as defined by the scope of the appended claims.

Having thus described the invention, what is claimed as new and desired to be secured by Letters Patent is:

1. In apparatus for feeding hay to a dehydrator, said apparatus having an elongated, inclined chute provided with an outlet opening, an endless conveyor in said chute for moving hay upwardly therealong, and means at the uppermost end of said conveyor for receiving the hay and directing the same laterally with respect to the direction of travel of the conveyor and into said outlet opening, leveling structure for preventing clogging of the hay in said means, said structure comprising a first drum carried by the chute intermediate the ends of the latter above the conveyor for rotation on a horizontal axis transversely of the direction of travel of the hay along the chute; and a second drum rotatably mounted on the chute above said conveyor adjacent said means for feeding hay to the latter, said drums each having laterally extending, hay-engaging fingers thereon, the drums being rotatable in opposite directions on parallel axes, said first drum being rotatable on an axis opposite to the direction of travel of the conveyor.

2. In apparatus for feeding hay to a dehydrator, said apparatus having an elongated, inclined chute provided with an outlet opening, an endless conveyor in said chute for moving hay upwardly therealong, and means at the uppermost end of said conveyor for receiving the hay and directing the same laterally with respect to the direction of travel of the conveyor and into said outlet opening, leveling structure for preventing clogging of the hay in said means, said structure comprising a first drum carried by the chute intermediate the ends of the latter above the conveyor for rotation on a horizontal axis transversely of the direction of travel of the hay along the chute; and a second drum rotatably mounted on the chute above said conveyor adjacent said means for feeding hay to the latter, said drums each having laterally extending, hay-engaging fingers thereon, the drums being rotatable in opposite directions on parallel axes, said first drum being rotatable on an axis opposite to the direction of travel of the conveyor, the fingers of said first drum being inclined with respect to the radius of the first drum away from the direction of rotation of the latter, the fingers of the second drum being inclined with respect to the radius of the second drum in the direction of rotation of the latter.

ELMER C. SMALL.

REFERENCES CITED

The following references are of record in the file of this patent:

UNITED STATES PATENTS

| Number | Name | Date |
|---|---|---|
| 85,782 | Bartlett | Jan. 12, 1869 |
| 315,764 | Good | Apr. 14, 1885 |
| 783,821 | Critchfield | Feb. 28, 1905 |
| 838,145 | Steele | Dec. 11, 1906 |
| 2,013,582 | Preisser | Sept. 3, 1935 |